United States Patent
Morofuji (10) Patent No.: US 7,437,065 B2
(45) Date of Patent: Oct. 14, 2008

(54) IMAGING APPARATUS

(75) Inventor: Tsuyoshi Morofuji, Shioya-gun (JP)

(73) Assignee: Canon Kabushiki Kaishi, Tokyo (JP)

(*) Notice: Subject to any disclaimer, the term of this patent is extended or adjusted under 35 U.S.C. 154(b) by 299 days.

(21) Appl. No.: 11/436,261

(22) Filed: May 17, 2006

(65) Prior Publication Data

US 2006/0269266 A1    Nov. 30, 2006

(30) Foreign Application Priority Data

May 25, 2005    (JP) .............................. 2005-152487

(51) Int. Cl.
  *G03B 17/00*    (2006.01)
(52) U.S. Cl. .......................................... 396/81; 396/80

(58) Field of Classification Search ............. 396/79–82, 396/87; 359/676, 683, 694, 696–698; 348/345, 348/347, 349
See application file for complete search history.

(56) References Cited

U.S. PATENT DOCUMENTS 5,956,528 A * 9/1999 Tanaka ........................ 396/52
6,314,240 B1 * 11/2001 Okawara ..................... 396/81

FOREIGN PATENT DOCUMENTS

JP    2002-221656 A    8/2002

* cited by examiner

*Primary Examiner*—Bot LeDynh
(74) *Attorney, Agent, or Firm*—Canon USA Inc IP Division (57) ABSTRACT

At least one exemplary embodiment is directed to an imaging apparatus which includes a rear-focus-type lens system configured to perform autofocusing on the basis of a video signal received from an image pickup device. The imaging apparatus can determine a distance from a subject on the basis of correlation information (cam locus) detailing a correlation between the position of a zoom lens and the focus position of a focus lens, with respect to infrared light and visible light, and selects or calculates and determines a cam locus to be used.

8 Claims, 12 Drawing Sheets

INFINITY LOCUS
(NORMAL LIGHT· INFRARED CUT FILTER PROVIDED,
INFRARED LIGHT· DUMMY GLASS PLATE PROVIDED)

Prior Art

IMAGING APPARATUS

This application claims foreign priority based on Japanese Patent application No. 2005-152487, filed May 25, 2005, the content of which is incorporated herein by reference in its entirety.

BACKGROUND OF THE INVENTION

1. Field of the Invention

The present invention relates to an imaging apparatus which, more particularly though not exclusively, can be used in teleconference systems and remote monitoring systems.

2. Description of the Related Art

In a typical electronic camera, a subject image formed on an image pickup device, such as a charge-coupled device (CCD) or a complementary metal-oxide semiconductor (CMOS) sensor is converted into an electric signal and further converted into a digital signal. Then, the resultant digital signal is subjected to predetermined signal processing, such as YC processing, and output as an image signal of a predetermined format.

Figure 11:
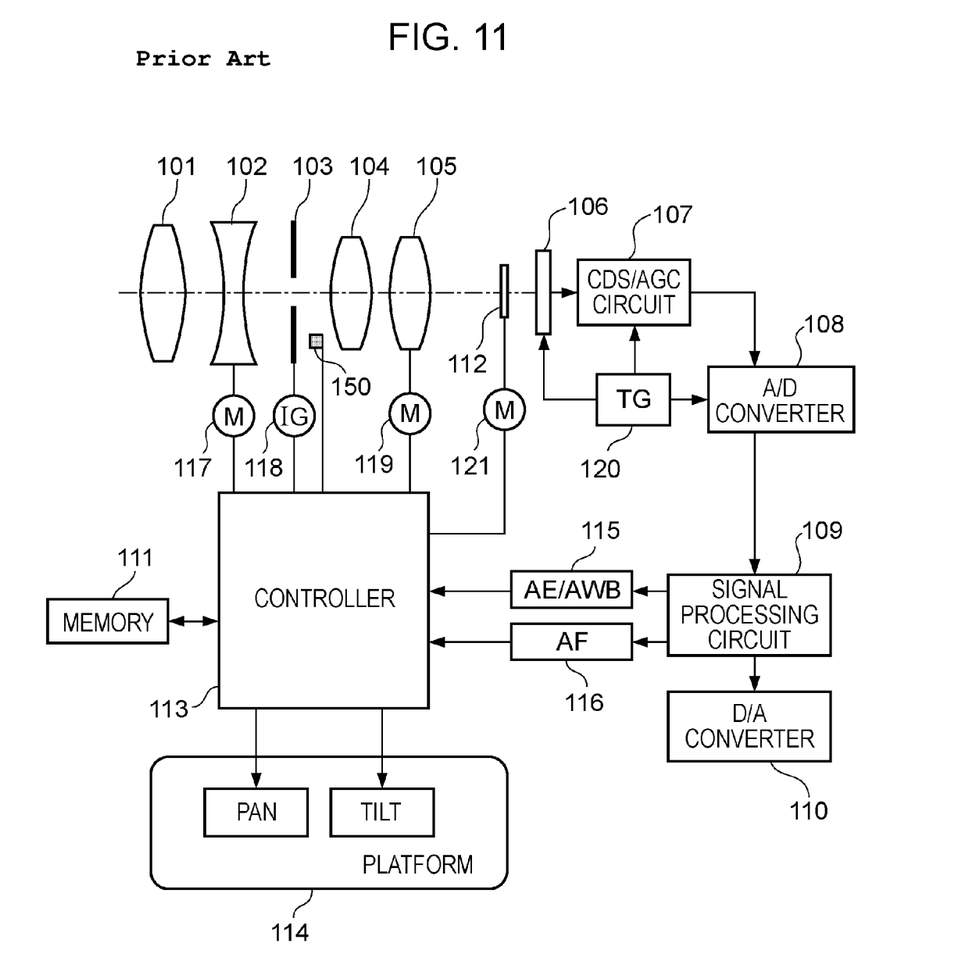
FIG. 11 is a block diagram showing a main configuration of an exemplary conventional camera system.

FIG. 11 is a block diagram showing a main configuration of a typical camera system.

Figure 2:
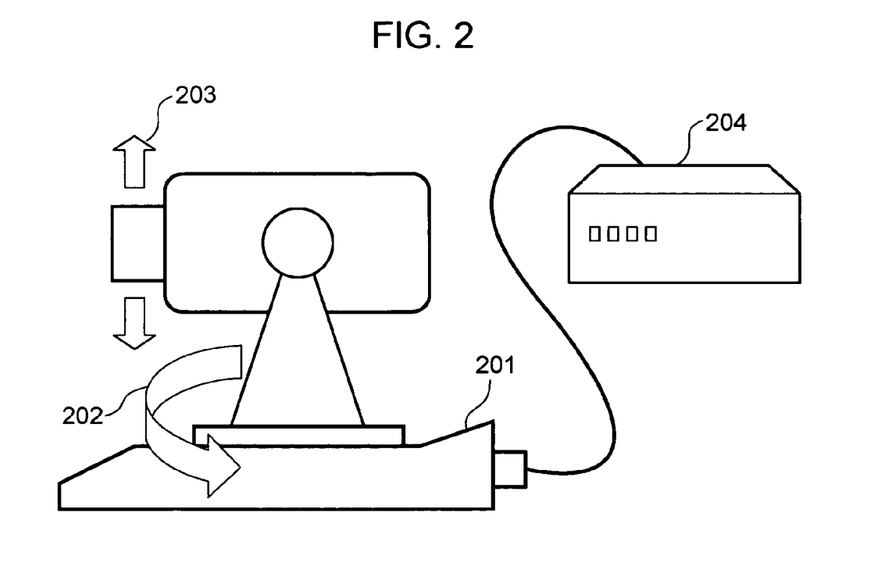
FIG. 2 is an external view illustrating a pan/tilt/zoom camera system for aid in explaining at least one exemplary embodiment.

In FIG. 11, reference numeral 101 denotes a fixed front lens (first lens unit), reference numeral 102 denotes a zoom lens (second lens unit) driven by a stepping motor 117, reference numeral 103 denotes an iris (or diaphragm) driven by a motor 118, reference numeral 104 denotes a fixed lens (third lens unit), and reference numeral 105 denotes a focus lens 105 driven by a stepping motor 119. Reference numeral 150 denotes a temperature sensor. Reference numeral 106 denotes an image pickup device, such as a CCD or a CMOS sensor, reference numeral 107 denotes a correlated double sampling and automatic gain control (CDS/AGC) circuit, reference numeral 108 denotes an analog-to-digital (A/D) converter, reference numeral 109 denotes a signal processing circuit, reference numeral 110 denotes a digital-to-analog (D/A) converter 110, and reference numeral 111 denotes a memory (storage device). Reference numeral 112 denotes an infrared cut filter for eliminating undesired infrared components. Reference numeral 113 denotes a controller (microcomputer) and reference numeral 114 denotes a power rotating platform capable of panning and tilting to any desired angle as illustrated in FIG. 2. Reference numeral 115 denotes a processing circuit for detecting autoexposure/auto white balance (AE/AWB) evaluation values. Reference numeral 116 denotes a processing circuit (hereinafter referred to as "AF-evaluation-value detecting circuit") for detecting an autofocus (AF) evaluation value. Reference numeral 120 denotes a timing generator.

In the configuration described above, the lenses 101, 102, 104, and 105 converge light from a subject to form an image on an imaging plane of the image pickup device 106. The image is then converted into an electric signal (analog video signal). The analog video signal passes through the CDS/AGC circuit 107 and is input to the A/D converter 108. When the iris 103 is in the full open position and the luminance signal level (the amount of light received by the image pickup device 106) is below a predetermined value, the CDS/AGC circuit 107 amplifies the analog video signal according to the brightness of the subject. Next, the A/D converter 108 converts the analog video signal into a digital signal (digital video signal). The signal processing circuit 109 performs processing that meets the video signal standard on the digital video signal. Examples of such processing include color separation, white balance control, and gamma correction. After the processing, the digital video signal is converted by the D/A converter 110 into a video signal of an appropriate format and output.

The AF-evaluation-value detecting circuit 116 includes a gate circuit for gating video signals corresponding to an area within a predetermined auto-focus frame defined in the imaging plane. The AF-evaluation-value detecting circuit 116 further includes a band-pass filter (BPF) for extracting, from the gated video signals, high-frequency components necessary for in-focus detection. A sharpness (focus evaluation) signal detected by the AF-evaluation-value detecting circuit 116 is supplied to the controller 113, which controls functions of the overall system, including AF, AE, and AWB.

The imaging plane of the image pickup device 106 includes color filters for producing images of respective colors. The infrared cut filter 112 for eliminating undesired infrared components is placed in the imaging optical path. A motor 121 is provided for insertion and removal of the infrared cut filter 112. Under low illumination, the motor 121 removes the infrared cut filter 112 from the optical path to improve sensitivity using the infrared sensitivity of the image pickup device 106. Directing infrared light from an infrared projector to the subject allows shooting under even darker conditions.

However, the insertion and removal of the infrared cut filter 112 affect the focus position. In other words, since the focus position changes depending on whether the infrared cut filter 112 is present in the optical path, it can be necessary in some circumstances to compensate for changes in back-focus position.

Figure 12:
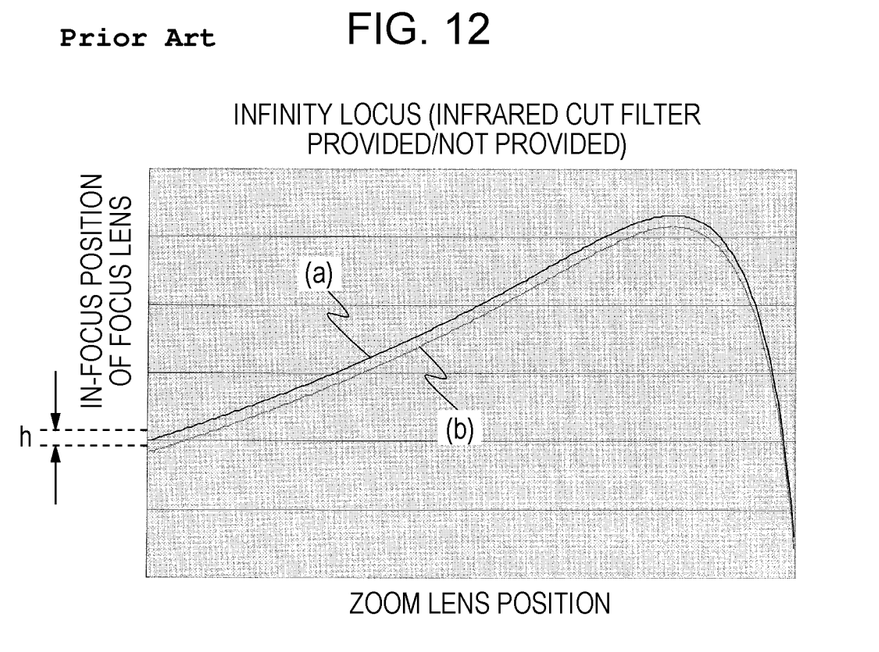
FIG. 12 illustrates an infinity loci when an infrared cut filter is placed and is not placed in the optical path in the camera system in FIG. 11.

FIG. 12 shows changes in zoom lens position and focus lens position, in the above-described camera system (typical rear-focus zoom lens system), with respect to a subject at infinity under a normal light source (e.g., 550 nm). Referring to FIG. 12, curve (a) represents the change when the infrared cut filter 112 is placed in the optical path, and curve (b) represents the change when the infrared cut filter 112 is not placed in the optical path. A focus difference indicated by "h" in FIG. 12 corresponds to the amount of back focus change. As shown, an in-focus position with respect to the subject at infinity is different depending on whether the infrared cut filter 112 is placed in the optical path.

Figure 13:
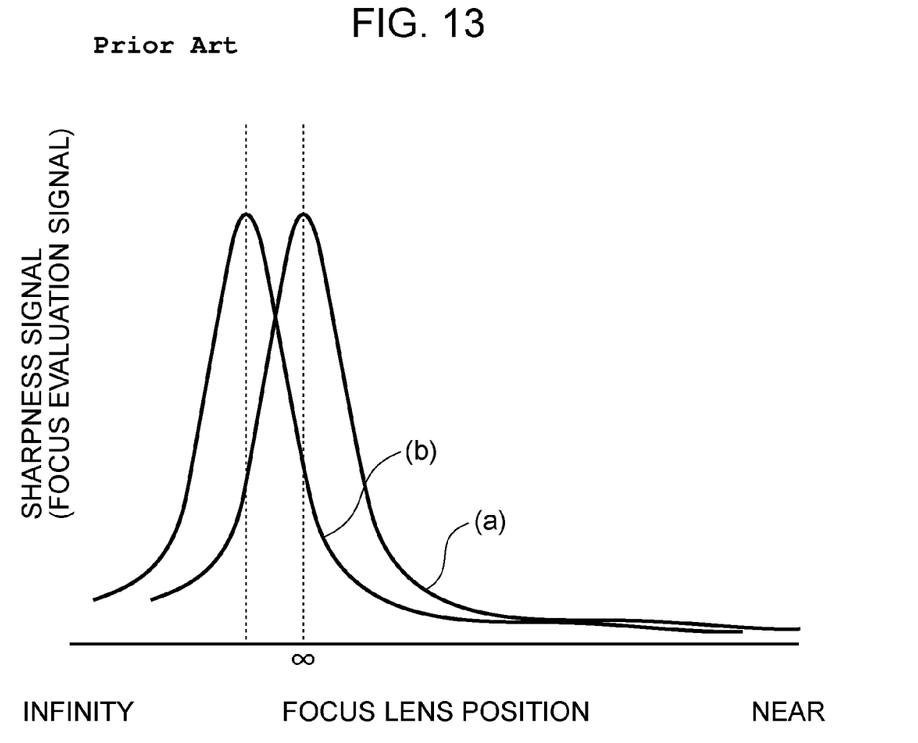
FIG. 13 is a diagram for explaining a sharpness signal (evaluation signal) for autofocusing when the infrared cut filter is placed and is not placed in the optical path.

FIG. 13 illustrates changes in sharpness signal (focus evaluation signal) output during shooting of the same subject (at infinity) under a normal light source. Curve (a) represents the change when the infrared cut filter 112 is placed in the optical path, and curve (b) represents the change when the infrared cut filter 112 is not placed in the optical path.

Japanese Patent Laid-Open No. 2002-221656 discusses a technique for compensating for changes in in-focus position, and specifically discusses a technique for varying the driving range of a focus lens depending on whether an infrared cut filter is present in the optical path.

However, typically only a back focus compensation is performed, thus significant defocusing can occur during a zooming operation.

SUMMARY OF THE INVENTION

At least one exemplary embodiment is directed to an imaging apparatus with the capabilities of a power zoom lens, a power rotating platform, autofocusing, and which facilitates insertion and removal of an infrared cut filter.

According to at least one exemplary embodiment, an imaging apparatus includes a driving control device having correlation information detailing a correlation between a zoom lens position according to a subject distance and the focus position of a focus lens, with respect to a plurality of light sources (e.g., detected by a light source detector as known by one of ordinary skill in the relevant arts and equivalents), and configured to control the driving (e.g., by a focus lens driving device) of the focus lens on the basis of the correlation information.

In at least one exemplary embodiment, locus information is selected or calculated according to the type of projection light source or illumination, changes in the wavelength of light in response to the insertion and removal of an infrared cut filter. Since the focus lens can be controlled on the basis of the locus information, an in-focus state can be achieved even if the wavelength of light from the subject has been changed.

Further features of the present invention will become apparent from the following description of exemplary embodiments with reference to the attached drawings.

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

In all of the examples illustrated and discussed herein any specific values, for example values of the subject distance, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments of the present invention will now be described in detail with reference to the attached drawings.

First Exemplary Embodiment

Figure 1:
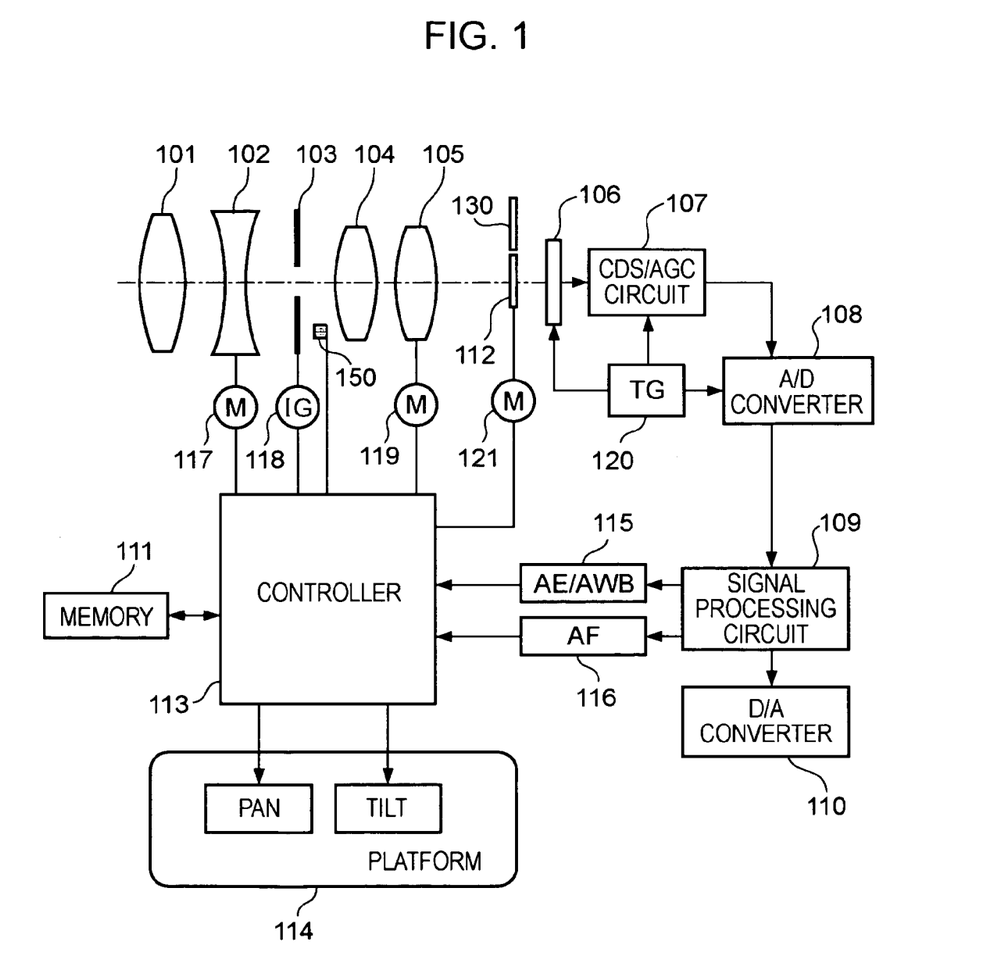
FIG. 1 illustrates a main configuration of a camera system according to a first exemplary embodiment of the present invention.

FIG. 1 illustrates a main configuration of a camera system according to the first exemplary embodiment of the present invention.

In FIG. 1, reference numeral 101 denotes a fixed front lens (first lens unit), reference numeral 102 denotes a zoom lens (second lens unit) driven by a stepping motor 117, reference numeral 103 denotes an iris (or diaphragm), reference numeral 104 denotes a fixed lens (third lens unit), and reference numeral 105 denotes a focus lens 105 driven by a stepping motor 119. Reference numeral 150 denotes a temperature sensor. Reference numeral 106 denotes an image pickup device, such as a CCD or a CMOS sensor, reference numeral 120 denotes a timing generator, reference numeral 107 denotes a CDS/AGC circuit, reference numeral 108 denotes an A/D converter, reference numeral 109 denotes a signal processing circuit, reference numeral 110 denotes a D/A converter 110, and reference numeral 111 denotes a memory. Reference numeral 112 denotes an infrared cut filter for eliminating and/or reducing infrared components contained in an optical image obtained by an imaging lens system. Reference numeral 113 denotes a controller (microcomputer) and reference numeral 114 denotes a power rotating platform capable of panning and tilting to any desired angle as illustrated in FIG. 2. Reference numeral 115 denotes a processing circuit for detecting AE/AWB evaluation values. Reference numeral 116 denotes an AF-evaluation-value detecting circuit for detecting an AF evaluation value. A control program for the controller 113 and locus information described below (i.e., correlation information detailing a correlation between the in-focus position of the focus lens 105 and the position of the zoom lens 102 according to the subject distance and corresponding to a plurality of light sources) are stored in the memory 111.

The lenses 101, 102, 104, and 105 converge light reflected off a subject to form an image on an imaging plane of the image pickup device 106. The image is then converted into an electric signal (analog video signal). When the iris 103 is in the full open position and the luminance signal level (the amount of light received by the image pickup device 106) is below a predetermined value, the CDS/AGC circuit 107 amplifies the analog video signal at a given amplification rate according to the brightness of the subject. Next, the A/D converter 108 converts the analog video signal into a digital signal (digital video signal). The signal processing circuit 109 performs processing that meets the video signal standard on the digital video signal. Examples of such processing include color separation, white balance control, and gamma correction. After the processing, the digital video signal is converted by the D/A converter 110 into a video signal of an appropriate format and output.

The AF-evaluation-value detecting circuit 116 includes a gate circuit for gating video signals corresponding to an area within a predetermined auto-focus frame defined in the imaging plane. The AF-evaluation-value detecting circuit 116 further includes a BPF for extracting, from the gated video signals, high-frequency components useful for in-focus detection. A sharpness (focus evaluation) signal detected by the AF-evaluation-value detecting circuit 116 (focus evaluation signal extracting device) can be supplied to the controller 113, which controls functions of the overall system, including AF, AE, and AWB.

When the infrared cut filter 112 is not placed in the optical path, a dummy glass plate 130 is placed, instead, to maintain the same optical distance as in the case where the infrared cut filter 112 is placed. In other words, the dummy glass plate 130 is provided so that the insertion and removal of the infrared cut filter 112 does not cause the focus position (back focus) to move. The motor 121 performs switching between the infrared cut filter 112 and the dummy glass plate 130. Matching an in-focus position under normal light with an in-focus position under infrared light, at the wide end and at infinity, is very effective for limiting the in-focus range.

The removal of the infrared cut filter 112 from the optical path can affect the overall length of the lens system, since the back focus distance increases. Therefore, placing the dummy glass plate 130 in the optical path after the removal of the infrared cut filter 112 can be used for reducing the overall length of the lens system. To simplify computation, the infrared cut filter 112 and the dummy glass plate 130 can be arranged, in view of the back focus position of the dummy glass plate 130 with respect to that of the infrared cut filter 112, such that their loci do not intersect each other.

FIG. 2 illustrates a camera system with panning, tilting, and zooming (PTZ) capabilities. Reference numeral 201 denotes a main body, reference numeral 202 denotes a moving direction of the angle of panning field, and reference numeral 203 denotes a moving direction of the angle of tilting field. Reference numeral 204 denotes a camera server.

Figure 3:
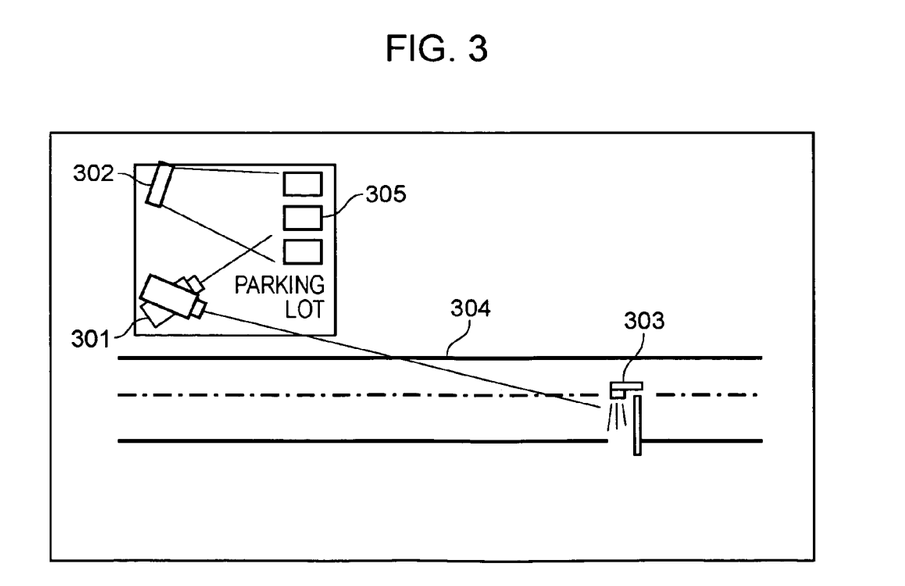
FIG. 3 illustrates an exemplary use of the camera-system in FIG. 1 or FIG. 2.

As an example of at least one exemplary embodiment, a nighttime shooting with a camera system for monitoring a parking lot will be described with reference to FIG. 3. In the drawing, reference numeral 301 denotes a camera system with a power rotating platform, such as the camera system shown in FIG. 2. Reference numeral 302 denotes an infrared light source for projecting infrared light, which is directed to a subject (vehicle) 305 in this example. Reference numeral 304 denotes a road. Reference numeral 303 denotes a distant streetlight.

For example, a normal light locus is used when the infrared cut filter 112 is placed in the optical path, while an infrared light locus is used when the infrared cut filter 112 is removed. With the infrared cut filter 112 removed, telephoto shooting works very well within the reach of the infrared light source 302. However, in the middle of shooting under infrared light, if the camera system 301 is directed to a subject under the distant streetlight 303 by the rotation of the power rotating platform, the in-focus position under visible light is located outside the infinity of infrared light. In this case, it can be difficult for bringing the subject into focus.

As described above, when switching, between the normal light locus and the infrared light locus, is performed in synchronization with the insertion and removal of the infrared cut filter 112, defocusing can occur during a zooming operation. Additionally the focus can be difficult to achieve during an operation for limiting the range of focus, with respect to a distant subject outside the reach of infrared light.

Figure 4:
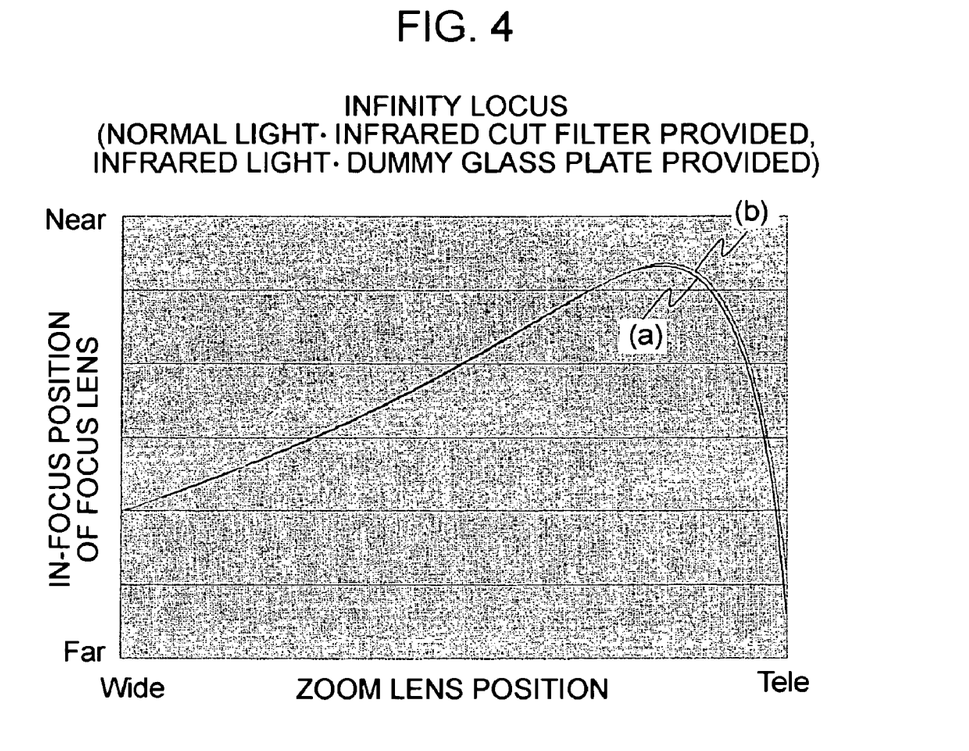
FIG. 4 is a diagram showing the infinity loci of infrared light and normal light in the camera system in FIG. 1 or FIG. 2.

FIG. 4 shows a positional relationship between a zoom lens (variator lens) and a focus lens (compensation lens) with respect to a subject at infinity. Referring to FIG. 4, a curve indicated by (a) represents a locus obtained under normal light (wavelength: 550 nm), while a curve indicated by (b) represents a locus obtained under infrared light (wavelength: 880 nm). A shift from the loci (a) to (b) can be caused by components of chromatic aberration.

Figure 5:
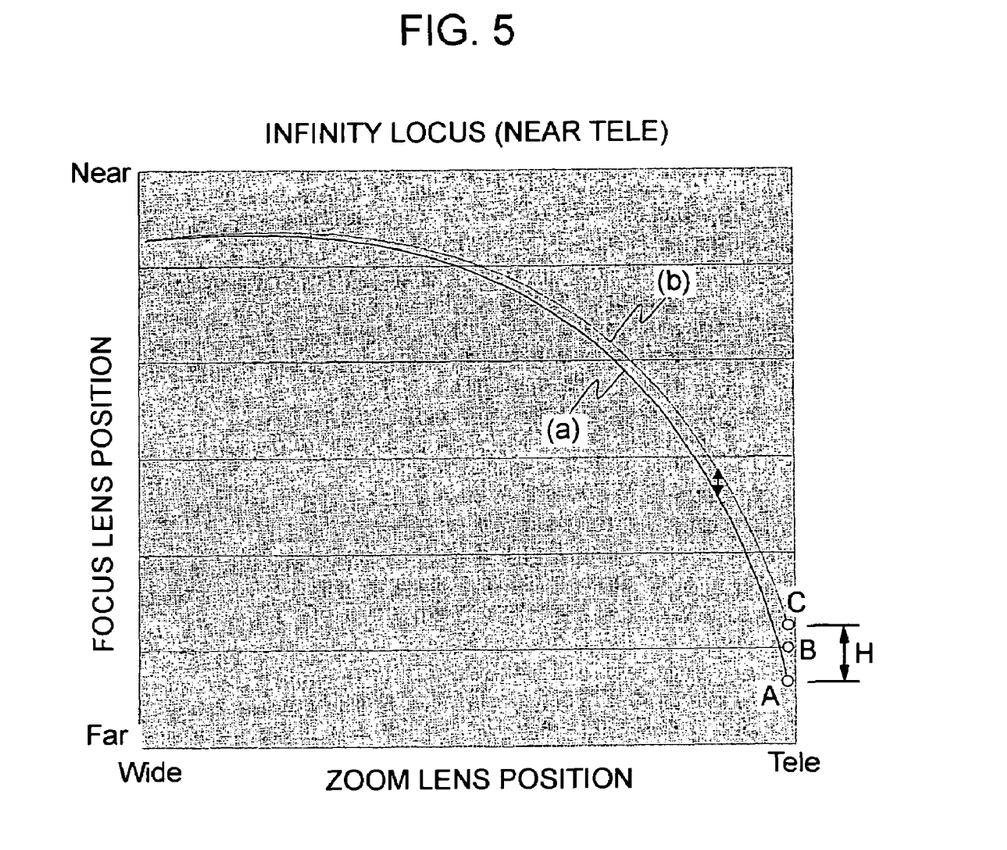
FIG. 5 is an enlarged view of a "telephoto end" portion of the diagram in FIG. 4.

FIG. 5 is an enlarged view of a "telephoto end (tele end)" portion of the diagram in FIG. 4. As can be seen from FIG. 5, with the infrared cut filter 112 removed, telephoto shooting works very well within the reach of infrared light. However, as described with reference to FIG. 3, when the camera system 301 is directed outside the range of infrared light, for example, directed to the subject under the distant streetlight 303, the in-focus position under visible light is located outside the infinity of infrared light. In this case, it can be difficult to bring the subject into focus.

Figure 6:
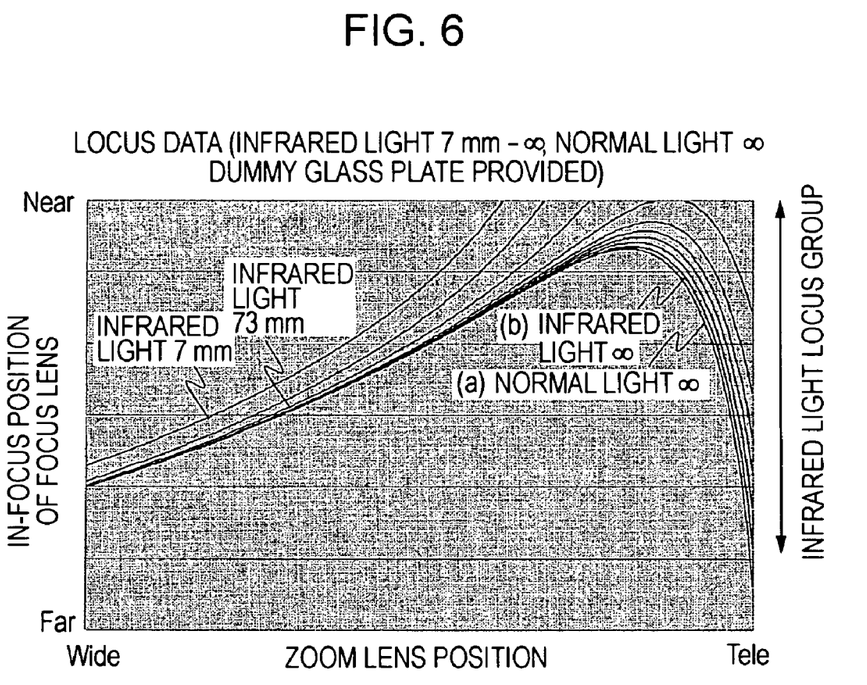
FIG. 6 is a diagram obtained by adding, to the diagram in FIG. 4, the loci of infrared light corresponding to subject distances of 7 mm and 73 mm.

FIG. 6 is a diagram obtained by adding a normal-light infinity locus (indicated by (a)) to a group of infrared light loci to facilitate addressing the problems described above. An infrared light locus is used at close range within the reach of infrared light. At an in-focus position between the infrared light infinity and the normal light infinity, an appropriate locus is used according to proximity to the subject. For a subject at infinity, the locus of normal light is used. Therefore, the locus of normal light can be used for areas outside the reach of infrared light. Thus, since a normal light locus can be used for areas outside the reach of infrared light, proper focus can be achieved during the zooming operation.

Shooting of a subject at infinity and at the telephoto end (tele end) will now be described with reference to FIG. 5. An infrared-light infinity locus is represented by curve (b) in FIG. 5. An in-focus state is achieved at point C under an infrared light source (e.g., wavelength: 880 nm). However, if a light source at infinity is natural light, an in-focus position obtained by autofocusing is located at point A on a normal-light infinity locus represented by curve (a) in FIG. 5. In this case, performing a zooming operation and a focus-range-limiting operation using the infrared-light infinity locus represented by curve (b) in FIG. 5 can cause defocusing, and an in-focus state is difficult to be achieved. Therefore, if an in-focus state is achieved at point C, the normal-light infinity locus can be used.

For example, in the case where an in-focus state is achieved at point B, the focus lens is moved during zooming while interpolation between the normal-light infinity locus (a) and the infrared-light infinity locus (b) is being performed within the range indicated by H. This allows proper focus to be achieved during zooming.

Figure 7:
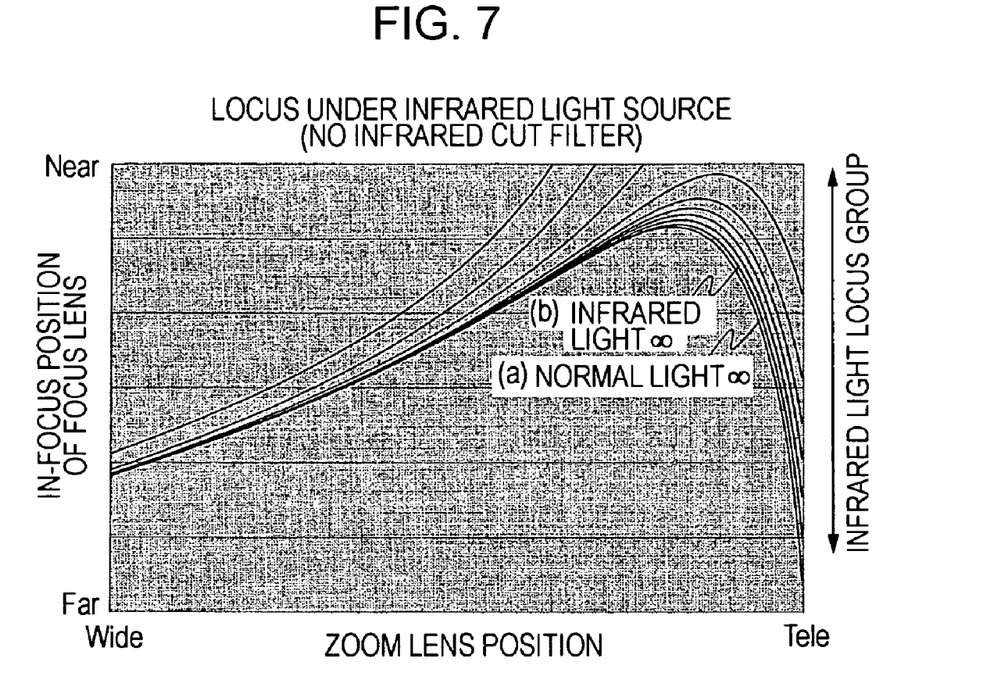
FIG. 7 is a diagram showing the loci of infrared light with respect to a plurality of subject distances in the camera system in FIG. 1 or FIG. 2.

This operation is also applicable to the case where the insertion and removal of the infrared cut filter 112 alone is performed. FIG. 7 is a diagram obtained by adding a normal-light infinity locus when the infrared cut filter 112 is removed, to a group of infrared light loci when the infrared cut filter 112 is removed.

There is also a method in which, according to the subject distance (as measured by a subject-distance detecting device), a group of infrared light loci is used within the reach of an infrared light source, while a group of normal light loci is used outside the reach of the infrared light source.

Differences in the light source do not significantly affect the performance of fixed-zoom and fixed-focus camera systems, since the subject distance is kept substantially constant and the depth of field is large. At least one exemplary embodiment is particularly effective for high-power camera systems with a power rotating platform.

In conjunction with the method described above, if temperature changes detected at the focus position are significant, the temperature sensor 150 can compensate for the shift of focus position caused by changes in ambient temperature and internal temperature of the camera system.

While an infrared light source with a primary wavelength of 880 nm has been described for exemplary purposes, exemplary embodiments are also applicable to various other light sources and wavelengths.

Second Exemplary Embodiment

Figure 8:
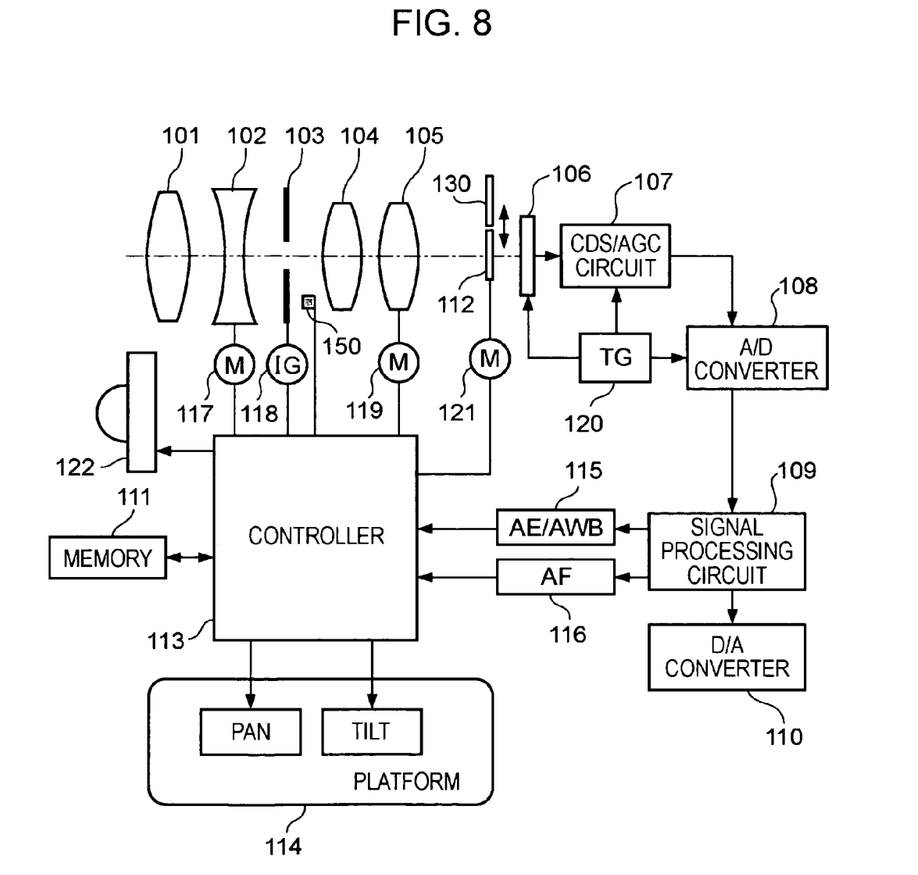
FIG. 8 illustrates a main configuration of a camera system according to a second exemplary embodiment of the present invention.

FIG. 8 illustrates a main configuration of a camera system according to the second exemplary embodiment of the present invention.

Figure 9:
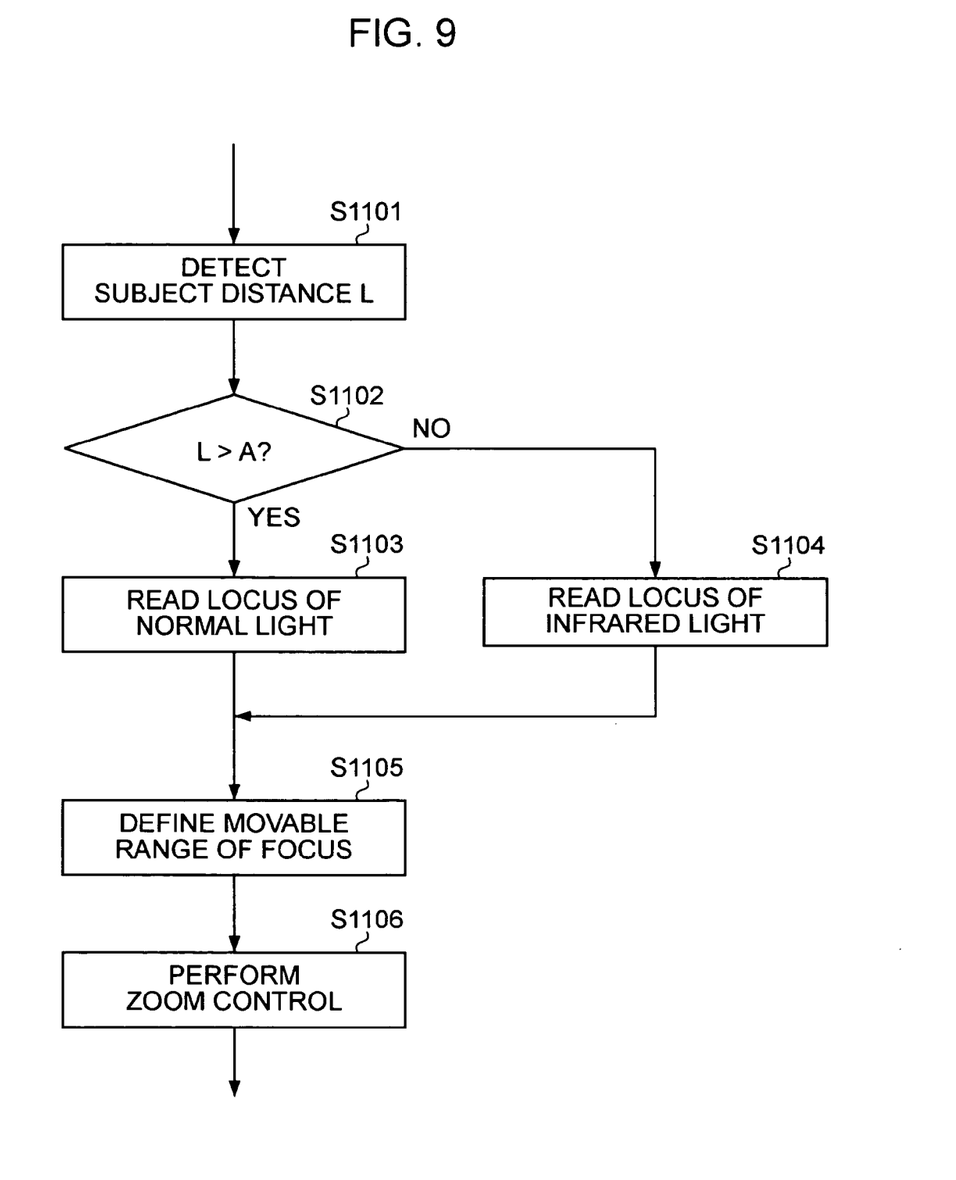
FIG. 9 is a flowchart showing the operation of the camera system in FIG. 8.

The camera system shown in FIG. 8 is obtained by adding an infrared illuminating device 122, such as an infrared light-emitting diode (wavelength: 880 nm), to the camera system shown in FIG. 1. A control program shown in FIG. 9 is stored in the memory 111 in FIG. 8.

A camera system with an infrared cut filter such as the infrared cut filter 112 shown in FIG. 8 can provide a device configured for switching the locus depending on whether the subject is located within the reach of infrared light.

The operation of the camera system in FIG. 8 will now be described with reference to the flowchart in FIG. 9. The infrared illuminating device 122 in the camera system can vary in reach but for this non limiting example has a reach of about 3 m. Switching between the normal light locus and the infrared light locus takes place at a switching point about 5 m away from the infrared illuminating device 122.

Step S1101: A subject distance L is calculated on the basis of the zoom lens position and the in-focus position of the focus lens.

Step S1102: The calculated subject distance L is compared with the maximum reach A (e.g., 5 m) of the infrared illuminating device 122. If the subject distance L is larger than the maximum reach A, the process proceeds to step S1103 and if not, the process proceeds to step S1104.

Step S1103: The locus of normal light (e.g., 550 nm) can be set to be used for a zooming operation and for defining the focus driving range.

Step S1104: The locus of infrared light (e.g., 880 nm) can be set to be used for a zooming operation and for defining the focus driving range.

Step S1105: The movable range of focus can be defined on the basis of locus information selected in step S1103 or step S1104.

Step S1106: A zoom control is performed.

If an external infrared light source can be used, information related to the infrared light source, such as emission wavelength, intensity (distance of reach), and direction, can be received via a communication channel.

Alternatively, a device configured for facilitating the user to enter the application range of the infrared light source can be provided for switching between loci to be used. Presetting the reach of infrared light in this way allows for smooth switching.

Third Exemplary Embodiment

The hardware configuration of the present exemplary embodiment is the same as that shown in FIG. 1. A control program shown in FIG. 10 is stored in the memory 111.

Figure 10:
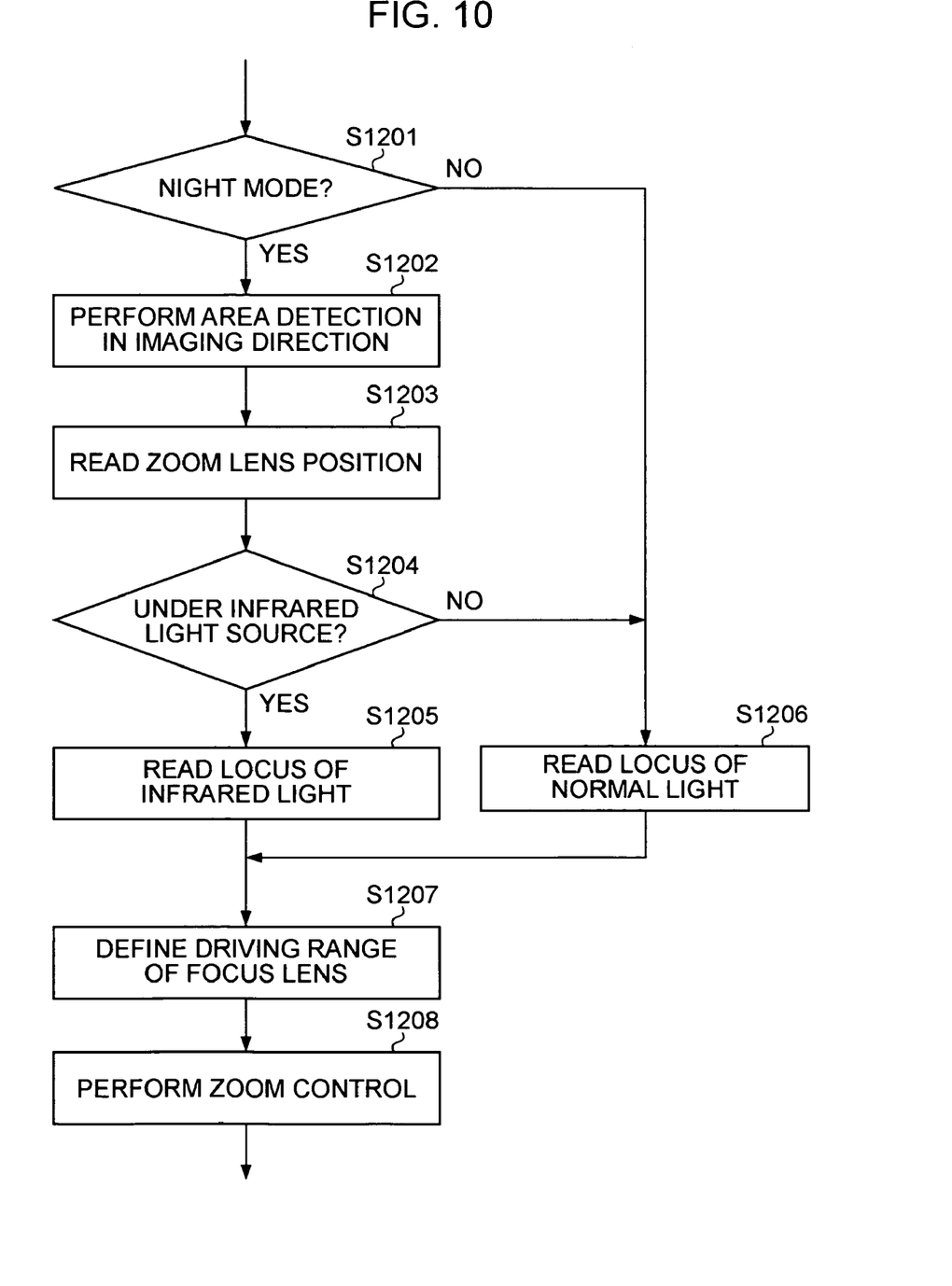
FIG. 10 is a flowchart showing the operation of a camera system according to a third exemplary embodiment of the present invention.

FIG. 10 is a flowchart showing the operation of a camera system capable of selecting an infrared light locus or a normal light locus, according to panning and tilting angles and zooming power in accordance with at least one exemplary embodiment. In preset mode, the user defines an area illuminated by infrared light or the area can be defined by an area defining device (e.g., a pre-selected area). An infrared light locus is used for shooting the defined area, while a normal light locus is used for shooting areas outside the defined area.

A non limiting example of a nighttime shooting with a camera system for monitoring a parking lot will be described with reference to FIG. 3. Like the camera system shown in FIG. 2, the camera system 301 has a power rotating platform. The infrared light source 302 projects infrared light, which is directed to the subject (vehicle) 305 in this example. There is the streetlight 304 along the road 303 and at a distant point.

Infrared-light locus data can be used for shooting of a subject (in this example, the subject 305) within the reach of the infrared light source 302. On the other hand, normal-light locus data can be used for shooting of a subject (in this example, a subject under the streetlight 303) outside the reach of the infrared light source 302. For shooting the subject under the streetlight 303, normal-light locus data can be used after the insertion of the infrared cut filter 112.

A description will be made with reference to FIG. 10.

Step S1201: If the camera system is in nighttime shooting mode (night mode), the process proceeds to step S1202. If the camera system is in normal mode, the process proceeds to step S1206.

Step S1202: Area detection is performed in an imaging direction (which can be changed by an imaging direction changing device) according to panning and tilting angles.

Step S1203: The position of the zoom lens is read.

Step S1204: Area determination is performed. If it is determined that the area is under an infrared light source, the process proceeds to step S1205. If not, the process proceeds to step S1206.

Step S1205: The locus of infrared light (e.g., 880 nm) is set to be used for a zooming operation and for defining the focus driving range.

Step S1206: The locus of normal light (e.g., 550 nm) is set to be used for a zooming operation and for defining the focus driving range.

Step S1207: The movable range of focus is defined.

Step S1208: Zoom control is performed.

As in the case of infrared light, setting predetermined loci and tracing of the loci of other illumination light sources can also be performed by automatic detection or user setting. With this configuration, an in-focus state can be achieved during zooming, and the focus driving range can be properly defined.

As described above in the exemplary embodiments, the following effects can be achieved according to at least one exemplary embodiment. That is, using a normal light locus for areas outside the reach of infrared light facilitates achieving proper focus during zooming. Moreover, since a point of switching between loci to be used can be changed according to the distance, proper focus can be achieved. Moreover, proper focus can be facilitated since a light source can be identified on the basis of changes in the amount of light and changes in white balance in response to the insertion or removal of the infrared cut filter. Additionally proper focus can be facilitated since interpolation between the cam loci of normal light and infrared light can be performed to obtain the locus that is most appropriate for the identified light source. Moreover, the arrangement of the dummy glass plate and the infrared cut filter is made such that the back-focus position when the dummy glass plate is provided is closer to the "near" side than that when the infrared cut filter is provided, and thus the calculation can be simplified.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-152487 filed May 25, 2005, which is hereby incorporated by reference herein in its entirety.

What is claimed is:

1. An imaging apparatus comprising:
   an image pickup device configured to convert a subject image into an electric signal;
   a rear-focus zoom lens system configured to form a subject image on the image pickup device including a zoom lens; and a focus lens;
   a focus-lens driving device configured to drive the focus lens;
   a storage device configured to store, for a given subject distance, a plurality of groups of locus information, each group corresponding to a different kind of light source, indicating a correlation between the zoom lens position and an in-focus position of the focus lens;
   a subject-distance detecting device configured to determine the distance of a subject on the basis of the zoom lens position and the focus lens position; and
   a controller configured to control the driving of the focus lens on the basis of the correlation information stored in the storage device,
   wherein the controller determines a locus information to be used, according to the subject distance detected by the subject-distance detecting device, by selection from the groups of locus information or calculation based on the groups of locus information stored in the storage device, wherein each group of locus information corresponds to an associated light source.

2. The imaging apparatus according to claim 1, further comprising imaging-direction changing device configured to change an imaging direction,
   wherein the controller determines locus information to be used according to an output of the imaging-direction changing device and the zoom lens position.

3. The imaging apparatus according to claim 1, further comprising a light-source detector configured to identify a light source that illuminates a subject,
   wherein the controller determines, according to an output of the light-source detector, locus information to be used for driving the focus lens.

4. The imaging apparatus according to claim 3, further comprising an infrared-component removal filter removably arranged in an imaging optical path and configured to reduce infrared light,
   wherein the light source is identified according to whether the infrared-component removal filter has been removed.

5. The imaging apparatus according to claim 4, further comprising a dummy glass plate configured to be inserted in the imaging optical path when the infrared-component removal filter is removed.

6. The imaging apparatus according to claim 1, further comprising:
   an area defining device configured to define an illuminating range of infrared light,
   wherein appropriate locus information is selected on the basis of the defined illuminating range of infrared light.

7. The imaging apparatus according to claim 1, further comprising:
   a focus-evaluation-signal extracting device configured to extract a focus evaluation signal, according to sharpness, from video signals obtained from the image pickup device,
   wherein the controller controls the focus-lens driving device, according to an output of the focus-evaluation-signal extracting device, such that an in-focus state is achieved.

8. The imaging apparatus according to claim 2, further comprising:
   an area defining device configured to define an illuminating range of infrared light,
   wherein appropriate locus information is selected on the basis of the defined illuminating range of infrared light.

* * * * *